(12) United States Patent
Cosgrove

(10) Patent No.: US 10,545,817 B2
(45) Date of Patent: Jan. 28, 2020

(54) DETECTING COMPUTER SYSTEM ANOMALY EVENTS BASED ON MODIFIED Z-SCORES GENERATED FOR A WINDOW OF PERFORMANCE METRICS

(71) Applicant: CA, Inc., New York, NY (US)

(72) Inventor: David Cosgrove, Portsmouth, NH (US)

(73) Assignee: CA, Inc., New York, NY (US)

( * ) Notice: Subject to any disclaimer, the term of this patent is extended or adjusted under 35 U.S.C. 154(b) by 158 days.

(21) Appl. No.: 15/687,638

(22) Filed: Aug. 28, 2017

(65) Prior Publication Data

US 2019/0065302 A1  Feb. 28, 2019

(51) Int. Cl.
*G06F 11/07* (2006.01)
*G06F 11/34* (2006.01)

(52) U.S. Cl.
CPC ...... *G06F 11/0793* (2013.01); *G06F 11/0754* (2013.01); *G06F 11/34* (2013.01)

(58) Field of Classification Search
CPC ............ G06F 11/0793; G06F 11/0754; G06F 11/079; G06F 11/34; G06F 11/3409
See application file for complete search history.

(56) References Cited

U.S. PATENT DOCUMENTS

| | | | | |
|---|---|---|---|---|
| 6,639,976 B1* | 10/2003 | Shellum | ............... | G06F 11/3409 379/111 |
| 2013/0110761 A1* | 5/2013 | Viswanathan | ......... | G06N 20/00 706/52 |
| 2015/0199254 A1* | 7/2015 | Vesepogu | ........... | G06F 11/3466 717/130 |
| 2015/0261963 A1* | 9/2015 | Ukil | ........................ | H04L 63/04 726/26 |
| 2016/0241576 A1* | 8/2016 | Rathod | ............... | H04L 63/1425 |
| 2016/0342910 A1* | 11/2016 | Chu | ..................... | G06Q 10/063 |

OTHER PUBLICATIONS

Detection of Outliers (Author unknown), Section 1.3.5.17, Engineering Statistics Handbook, http://www.itl.nist.gov/div898/handbook/eda/section3/eda35h.htm, pp. 1-5, (downloaded from the Internet Aug. 17, 2017).

* cited by examiner

*Primary Examiner* — Yolanda L Wilson
(74) *Attorney, Agent, or Firm* — Kowert, Hood, Munyon, Rankin & Goetzel, P.C.

(57) ABSTRACT

A performance anomaly detector obtains a performance metric value from a performance measurement of operation of a resource, and determines a modified Z-score based on the. Occurrence of an anomaly event for the resource is detected responsive to determining that: 1) the modified Z-score exceeds a Z-score anomaly threshold; and 2) a threshold number of other modified Z-scores, which are determined for the other performance metric values in the sequence and are within a sequence window range of the performance metric value, also exceed the Z-score anomaly threshold. A remedial action for the resource is initiated responsive to detecting the occurrence of the anomaly event for the resource.

20 Claims, 9 Drawing Sheets

DETECTING COMPUTER SYSTEM ANOMALY EVENTS BASED ON MODIFIED Z-SCORES GENERATED FOR A WINDOW OF PERFORMANCE METRICS

BACKGROUND

The present disclosure relates to detecting anomalous operational performance of operational resources of computing systems.

Distributed computing systems, sometimes also referred to as cloud computing systems, are used to provide services to electronic devices which may be operated by end users. In a cloud computing system, the resource architecture is hidden from the end user. The resource architecture can include computer servers, network non-volatile storage devices, computing devices, network routers, network gateways, wireless/wired network interface circuits, etc. Because services are deployed on a resource architecture which is hidden from end users, it can be managed, upgraded, replaced or otherwise changed by a system administrator (operator) without the end users being aware of or affected by the change.

System administrators are tasked with managing individual resources in the system, but their effectiveness is affected by their knowledge of the system and frequency and detail of their performing monitoring. Administrators may manually create event alerting rules which are triggered by anomalous conditions, and which generate alerts to the administrators and/or a network operations center. These semi-static alerting rules may lack sufficient sensitivity to variations between the operational loading and hardware configuration of different computing systems, and to changes over time in a computing system.

SUMMARY

Some embodiments disclosed herein are directed to a method of performing operations on a processor of a performance anomaly detector. The operations include obtaining a performance metric value from a performance measurement of operation of a resource of a computing system, and determining a modified Z-score based on the performance metric value. The modified Z-score is compared to a Z-score anomaly threshold. Occurrence of an anomaly event for the resource is detected responsive to determining that: 1) the modified Z-score exceeds the Z-score anomaly threshold; and 2) a threshold number of other modified Z-scores, which are determined for the other performance metric values in the sequence and are within a sequence window range of the performance metric value, also exceed the Z-score anomaly threshold. A remedial action for the resource is initiated responsive to detecting the occurrence of the anomaly event for the resource.

Some other embodiments disclosed herein are directed to performing operations on a processor of a performance anomaly detector. The operations include obtaining a performance metric value from a performance measurement of operation of a resource of a computing system, and determining a modified Z-score based on the performance metric value. The modified Z-score is compared to a Z-score anomaly threshold. Occurrence of an anomaly event for the resource is detected responsive to determining that: 1) the modified Z-score exceeds the Z-score anomaly threshold; and 2) a threshold number of other modified Z-scores, which are determined for the other performance metric values in the sequence and are within a sequence window range of the performance metric value, also exceed the Z-score anomaly threshold. A remedial action for the resource is initiated responsive to detecting the occurrence of the anomaly event for the resource. The remedial action includes communicating with a resource management computer node to initiate offloading of processing of communication traffic in existing network communication sessions, which are with user devices and are being processed by the resource, from the resource to at least one other resource of the computing system.

Some other embodiments disclosed herein are directed to a performance anomaly detector that includes a network interface circuit, a processor circuit, and a memory circuit. The network interface circuit is configured to communicate with resources of a distributed computing system. The processor circuit is coupled to the network interface circuit. The memory circuit is coupled to the processor circuit and stores program code which when executed by the processor circuit causes the processor circuit to perform operations. The operations include communicating a message through the network interface circuit and containing a performance metric polling command addressed to an application programming interface provided by a resource among the resources. A response message is received through the network interface circuit and contains a performance metric value from a performance measurement of a resource of a distributed computing system performed responsive to the performance metric polling command A modified Z-score is determined based on the performance metric value. The modified Z-score is compared to a Z-score anomaly threshold. Occurrence of an anomaly event for the resource is detected responsive to determining that: 1) the modified Z-score exceeds the Z-score anomaly threshold; and 2) a threshold number of other modified Z-scores, which are determined for the other performance metric values in the sequence and are within a sequence window range of the performance metric value, also exceed the Z-score anomaly threshold. A remedial action for the resource is initiated responsive to detecting the occurrence of the anomaly event for the resource. Volatility is determined from the amount of variation over time in the sequence of performance metric values comprising the performance metric value and other performance metric values that were measured for the resource earlier in time than the performance metric value. The Z-score anomaly threshold is increased when the volatility measurement indicates more than a first threshold level of volatility, and is decreased when the volatility measurement indicates less than a second threshold of volatility that is not greater than the first threshold level of volatility.

Other methods, performance anomaly detectors, and/or computer program products according to embodiments will be or become apparent to one with skill in the art upon review of the following drawings and detailed description. It is intended that all such additional methods, performance anomaly detectors, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Figure 1:
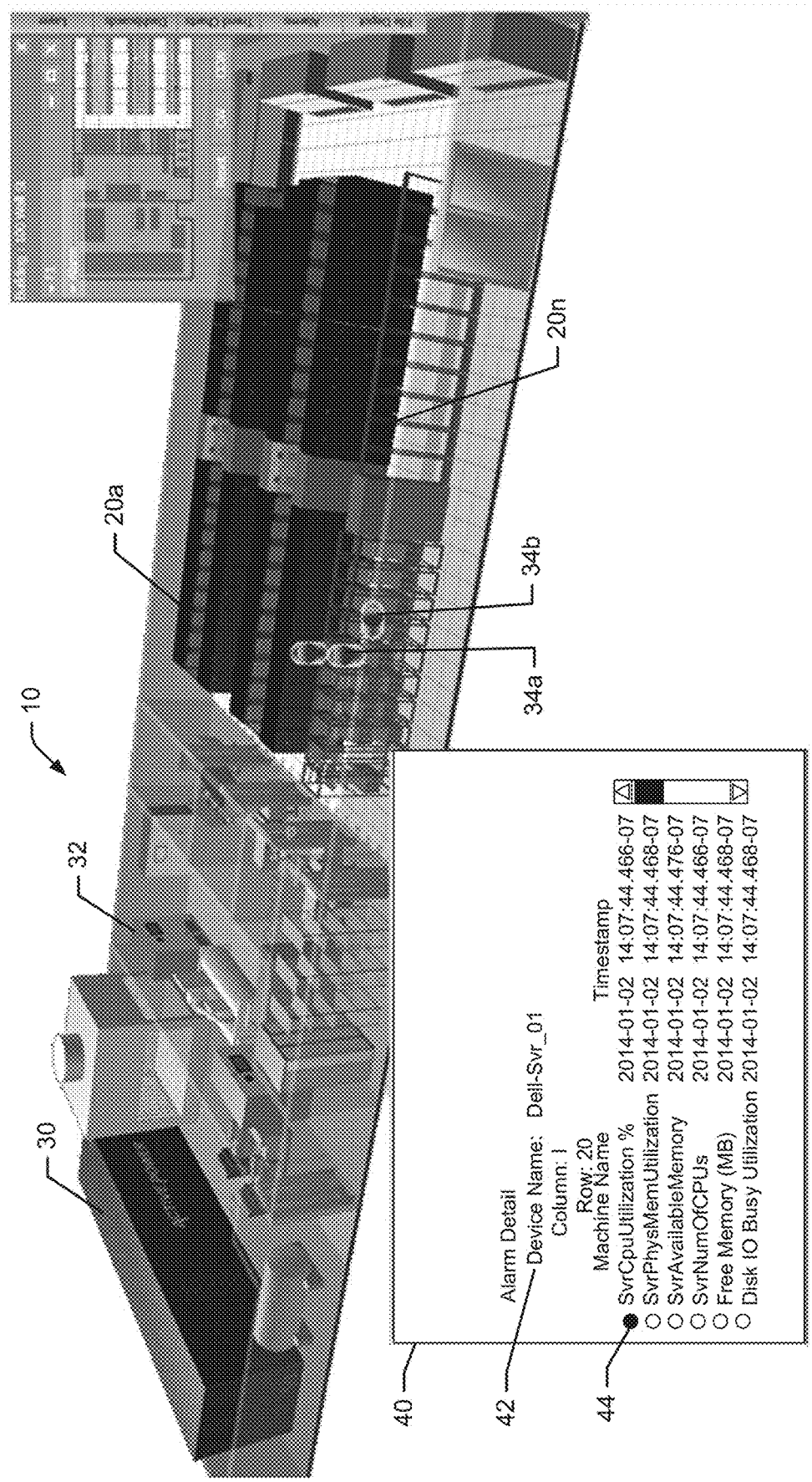
FIG. 1 is a pictorial illustration of a distributed computer system that is configured as a data center and has a performance anomaly detector configured according to some embodiments.

FIG. 1 is a block diagram of a distributed computer system that is configured as a data center 10 according to some embodiments. The data center 10 can include hundreds or thousands of data servers which are mounted to physical racks 20a-20n arranged in rows for accessibility by operators. The data servers consume substantial amounts of electrical power from a power source 30, occupy physical rack storage space of the data center 10, and require cooling heat transfer by a cooling system 32 to remain within an acceptable operational temperature range. The electrical power, physical rack storage space, cooling, and other support systems are examples of infrastructure provided by the data center 10 to support operation of the data servers.

The data servers, network firewalls, network routers, network switches, software defined network (SDN) controllers, and other processing and network communication devices are example hardware resources of the data center 10. Software resources are other types of resources, which may include applications, operating systems, virtual machine hypervisors, etc. Although various embodiments are explained in the context of a data center, they are not limited thereto. Embodiments can be used with other types of computing systems, distributed computing systems, and/or other hardware and/or software resources that can be used in computing systems, including, but not limited to, desktop computers, network firewalls, network routers, network switches, SDN controllers, and other resources.

In accordance with some embodiments, the data center 10 includes, or is communicatively networked to, a performance anomaly detector, which can also be mounted within one or more of the physical racks 20 or separate therefrom, and can operate according to various embodiments disclosed herein. The performance anomaly detector detects occurrence of an anomaly event for monitored ones of the resources of the data center 10. The performance anomaly detector can initiate a remedial action for the resource responsive to detecting the occurrence of the anomaly event for the resource. The performance anomaly detector can be connected to a resource management computer node to initiate as the remedial action offloading, by the resource management computer node, of processing of communication traffic in existing network communication sessions, which are with user devices and are being processed by the resource, from the resource to at least one other resource of the distributed computing system. The performance anomaly detector may additionally or alternatively communicate with a resource management computer node to initiate as the remedial action, decreasing an amount incoming website request messages being directed to the resource relative to being directed to at least one other resource of the distributed computing system. In some other embodiments, the remedial action includes performance anomaly detector, or a connected resource management computer node, communicating an alert message containing information identifying the occurrence of the anomaly event and an identifier of the resource, to an operator console display device.

The performance anomaly detector and/or a connected resource management computer node may display reports indicating performance metric values from performance measurements of resources of the data center 10. In the non-limiting example of FIG. 1, a report 40 is displayed on a display device of a data center terminal. The report 40 identifies the name 42 of one of the resources (e., data server "Dell-Srv_01") identifies utilization values that have been measured (i.e., as the performance metric values) for that resource while processing a software application. The utilization values displayed in the example report 40 of FIG. 1 include server CPU utilization percentage, server physical memory utilization, server available memory, server number of CPUs, free memory, and/or disk input/output busy utilization. The report may further indicate if any of the resources are operating near defined limits.

A pictorial illustration of the data center 10 may also be displayed. The resource management computer node may display graphical alarm indications 34a and 34b at particular locations of the racks where the data center operator may want to deploy further server devices or other resources, and/or to offload network traffic and/or processing tasks, based on information provided by the performance anomaly detector and/or a resource management computer node according to one or more embodiments disclosed herein.

These and other operations are explained in further detail below after the following explanation of a distributed computing system in which the operations may be performed.

Distributed Computing System

Figure 2:
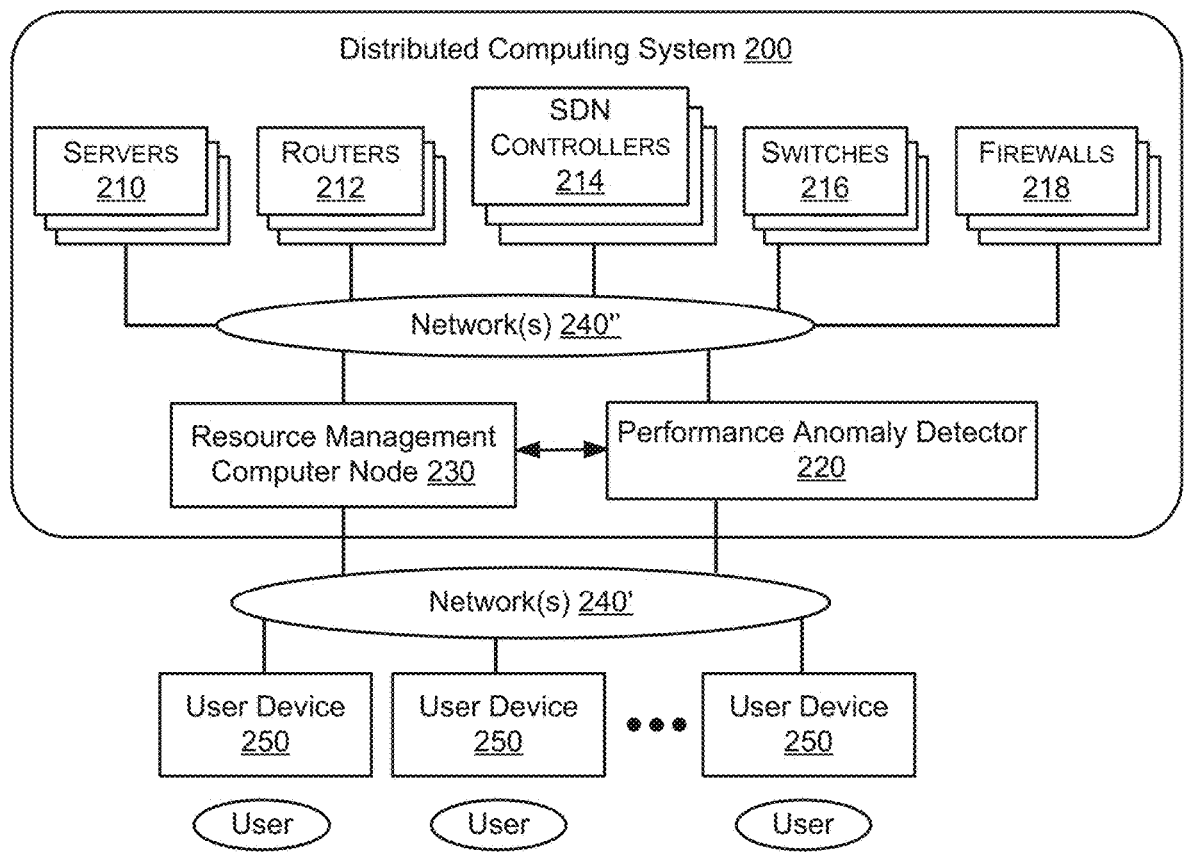
FIG. 2 is a block diagram of a performance anomaly detector that controls a management computer node in a distributed computing system, according to some embodiments.

FIG. 2 is a block diagram of a distributed computing system 300 which may correspond to the data center 10 of FIG. 1, and that is configured according to some embodiments. Referring to FIG. 2, the distributed computing system 200 receives requests from electronic devices 250 via one or more networks 240'-240" for processing. The electronic devices 250 may be operated by end-users. The distributed computing system 200 includes a plurality of resource nodes, a performance anomaly detector 220, and a resource management computer node 230, which are communicatively interconnected by the one or more networks 240'-240".

The electronic devices 250 may include, but are not limited to, desktop computers, laptop computers, tablet computers, wireless mobile terminals (e.g., smart phones), gaming consoles, networked televisions with on-demand media request capability. The resource nodes may include servers 210 (e.g., network content servers such as Internet website servers, movie/television programming streaming servers, application program servers), network packet routers 212, SDN controllers 214, network communication switches 216, network communication firewalls 218, network storage devices (e.g., cloud data storage servers), network gateways, communication interfaces, program code processors, data memories, display devices, and/or peripheral devices. The resources may further include computer resources such as: processor(s) 116 (e.g., central processing unit, CPU); network interface(s) 118; memory device(s) 120; data mass storage device(s) 122 (e.g., disk drives, solid state nonvolatile memory, etc.); etc. For some distributed computing systems 300, the number of resource nodes can number more than a hundred or thousand.

The resource management computer node 230 may operate to distribute individual requests that are received from the electronic devices 250 to particular ones of the resource nodes which it selects for processing. The resource management computer node 230 may select among the resource nodes for distributing individual requests responsive to the present loading of the resource nodes and signaling for actions initiated by the performance anomaly detector 220. The loading may be determined based on the performance metric values measured for a resource, which may include processing resources, volatile memory resources, non-volatile mass storage resources, communication resources, and/or application resources that are utilized to process the requests. The resource management computer node 230 may, for example, operate to distribute the requests responsive to occurrence of an anomaly events detected by the performance anomaly detector 220 in accordance with various operations described below.

Example Performance Anomaly Detector

Figure 3:
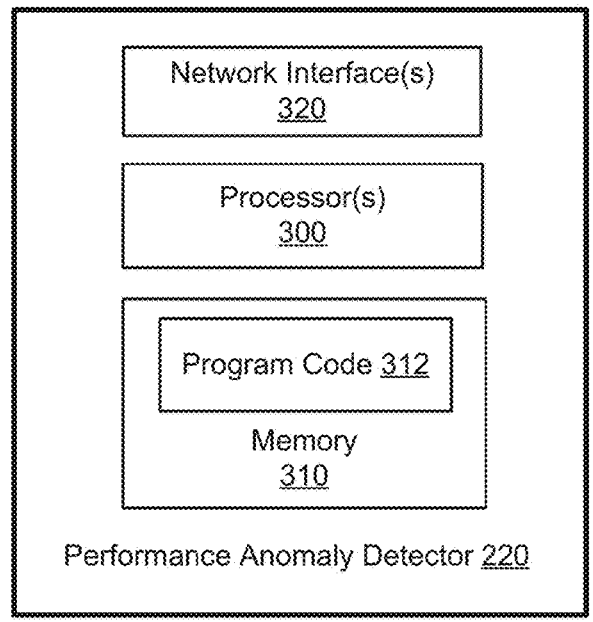
FIG. 3 is a block diagram of components of a performance anomaly detector that is configured according to some embodiments.

FIG. 3 is a block diagram of a performance anomaly detector 220 that is configured to perform the operations of one of more of the embodiments disclosed herein. The performance anomaly detector 220 can include one or more network interface circuits 320 (referred to as "network interface" for brevity), one or more processor circuits 300 (referred to as "processor" for brevity), and one or more memory circuits 310 (referred to as "memory" for brevity) containing program code 312.

The processor 300 may include one or more data processing circuits, such as a general purpose and/or special purpose processor (e.g., microprocessor and/or digital signal processor) that may be collocated or distributed across one or more networks. The processor 300 is configured to execute program code 312 in the memory 310, described below as a computer readable medium, to perform some or all of the operations for one or more of the embodiments disclosed herein.

Detecting Occurrence of Anomaly Events

As explained above, system administrators have traditionally been tasked with manually creating event alerting rules which are triggered by anomalous conditions. These semi-static alerting rules may lack sufficient sensitivity to operational loading and configuration variations between systems and to dynamic changes in a system.

FIGS. 4-12 are flowcharts that illustrate operations performed by a processor of a performance anomaly detector to detect occurrence of an anomaly event and responsively initiate a remedial action, in accordance with some embodiments.

Figure 4:
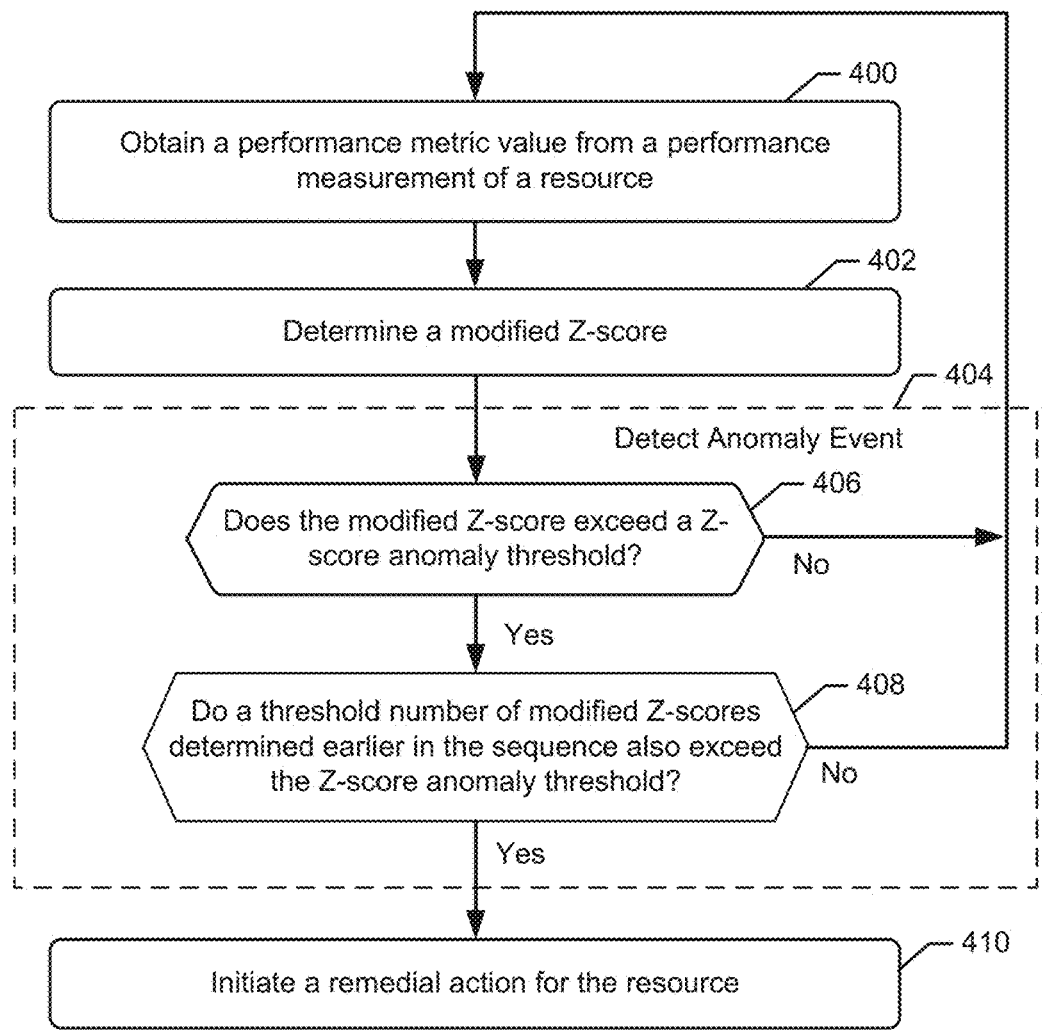
FIGS. 4-12 are flowcharts that illustrate operations by a performance anomaly detector in accordance with some embodiments.

Referring to FIG. 4, a performance metric value is obtained (block 400) from a performance measurement of a resource of a distributed computing system. A modified Z-score is determined (block 402) based on the performance metric value.

Determination of the modified Z-score can include determining a median of a sequence of performance metric values which comprise the performance metric value and other performance metric values that were measured for the resource earlier in time than the performance metric value. A median absolute deviation of the sequence of performance metric values, is determined. A difference value is determined between the performance metric value and the median. The modified Z-score is then determined based on a ratio of the difference value to the median absolute deviation.

The modified Z-score is compared to a Z-score anomaly threshold. Operations are then performed to detect (block 404) occurrence of an anomaly event. The operations include determining (block 406) if the modified Z-score exceeds a Z-score anomaly threshold and, if so, further determining (block 408) if a threshold number of modified Z-scores determined earlier in the sequence also exceed the Z-score anomaly threshold. If both conditions are met, a remedial action is initiated (block 410) for the resource.

The operations to detect (block 404) therefore correspond to detecting occurrence of an anomaly event for the resource responsive to determining that: 1) the modified Z-score exceeds the Z-score anomaly threshold; and 2) a threshold number of other modified Z-scores, which are determined for the other performance metric values in the sequence and are within a sequence window range of the performance metric value, also exceed the Z-score anomaly threshold. The remedial action for the resource is initiated (block 410) responsive to detecting the occurrence of the anomaly event for the resource. The sequence window range therefore defines a number of the modified Z-scores that have been determined for performance metrics in a sequence. As will be explained later below, the condition for a threshold number of other modified Z-scores, which are determined for the other performance metric values in the sequence and are within the sequence window range of the performance metric value, also exceed the Z-score anomaly threshold, may correspond to determining that X of the modified Z-scores within a sequence of length Y of the determined modified Z-scores, exceed the Z-score anomaly threshold.

The performance anomaly detector 220 may obtain the performance measurement of a resource from a performance monitoring tool, such as Network Flow Analyzer by CA Technologies. Alternatively or additionally, the performance anomaly detector 220 may send messages that access application programming interfaces of the resources to obtain performance metrics therefrom. In one embodiment, the operation to obtain (block 400) the performance metric value includes generating a message containing a performance metric polling command addressed to an application programming interface provided by the resource, and communication the message to the network interface circuit 320 and addressed for delivery to the resource.

Figure 5:
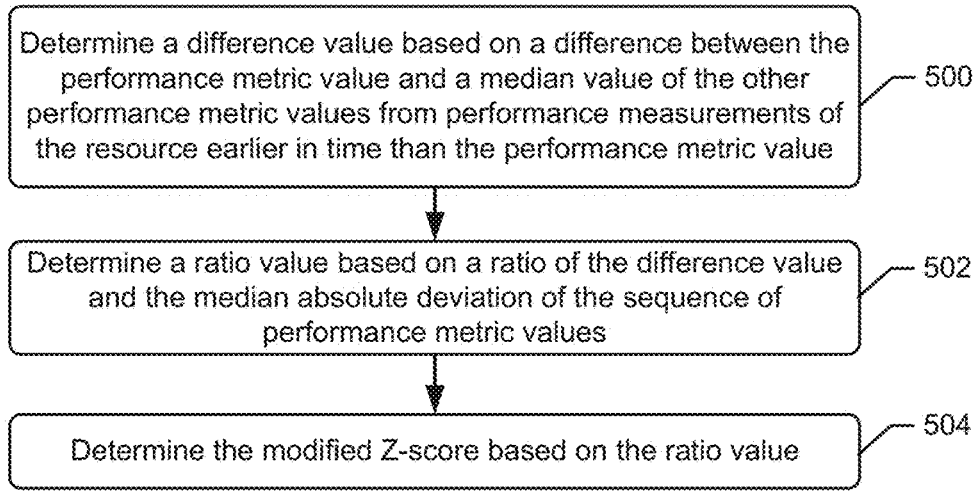
Figure 6:
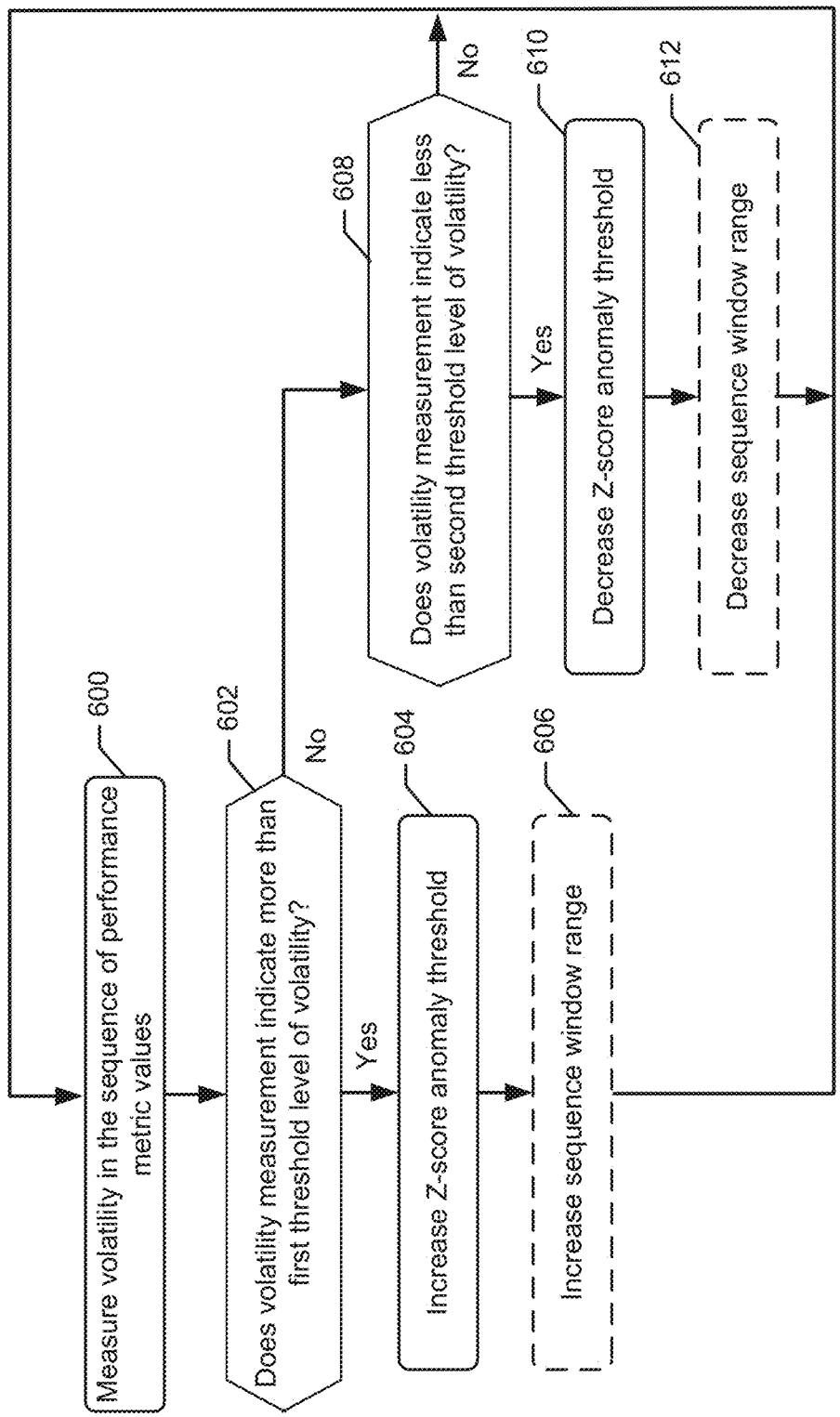
Figure 7:
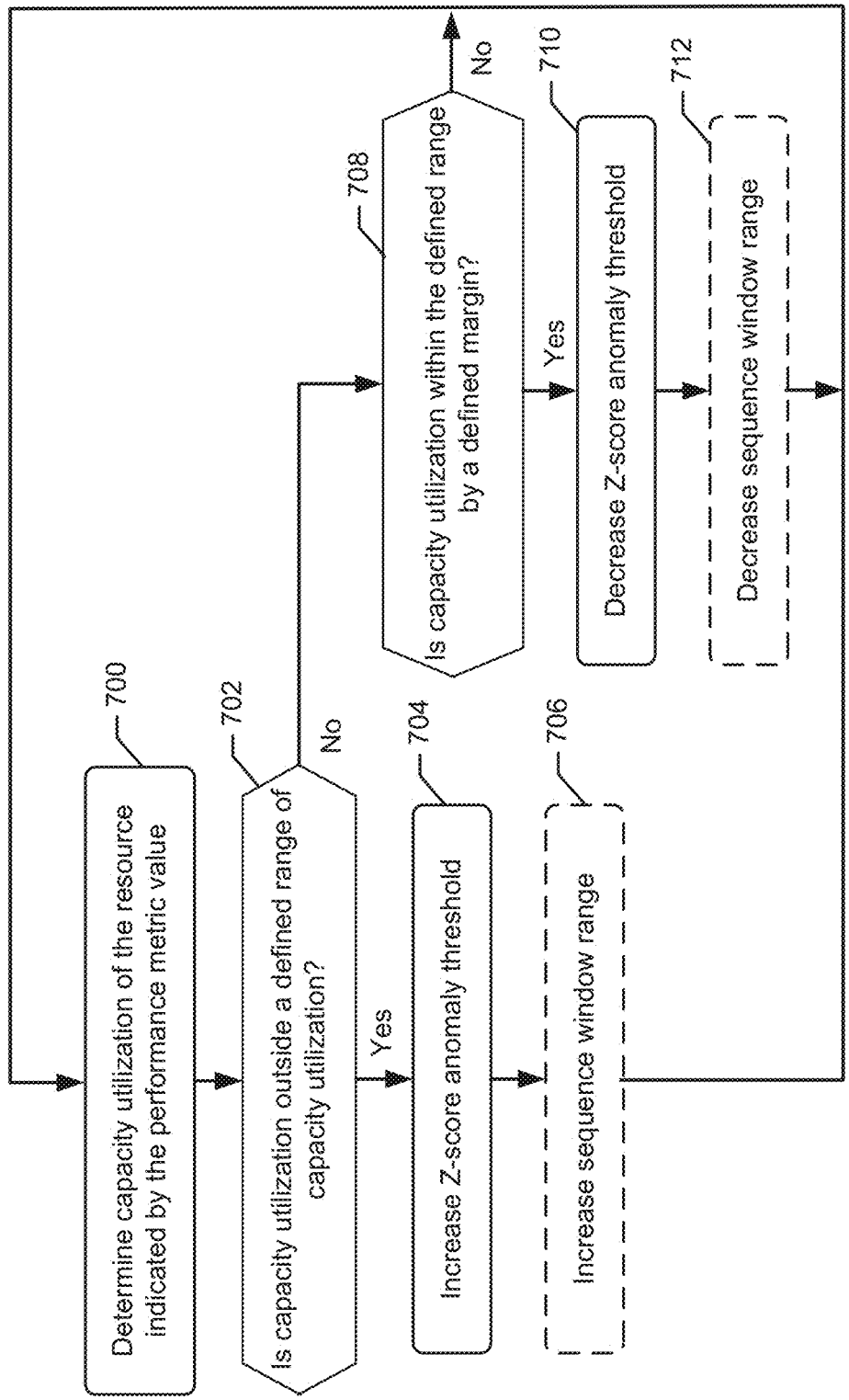

Some further embodiments are directed to operations for determining the modified Z-score performance metric value that is obtained and a sequence of performance metric values that were earlier obtained from the resource. Referring to FIG. 5, determination of the modified Z-score can include determining (block 500) a difference value based on a difference between the performance metric value and a mean value of the other performance metric values from performance measurements of the resource earlier in time than the performance metric value, determining (block 502) a ratio value based on a ratio of the difference value and the median absolute deviation of the sequence of performance metric values, and then determining (block 504) the modified Z-score based on the ratio value.

In one embodiment, a modified Z-score, Mi, is determined based on the following equation:

$$M_i = \frac{.6745(x_i - x')}{MAD}$$

where $X_i$ is the performance metric value that is obtained (block 400), x' is a median value of performance metric values that were obtained from earlier measurements of the resource, and MAD is a median absolute deviation of the sequence of performance metric values.

Detecting occurrence of an anomaly event based on the modified Z-score can improve accuracy and robustness of the detection, by avoiding outlier performance metric values having an overly heavy influence on the detection. This approach using modified Z-scores can make the detection less sensitive to variations between typical performance metric value distributions of various resources, and make the detection less sensitive to differences between the particular operational configuration of the resource being measured and/or the performance characteristic (e.g., processor utilization, data communication rate, input/output error rate, etc.) of the resource that is being measured.

Figure 13:
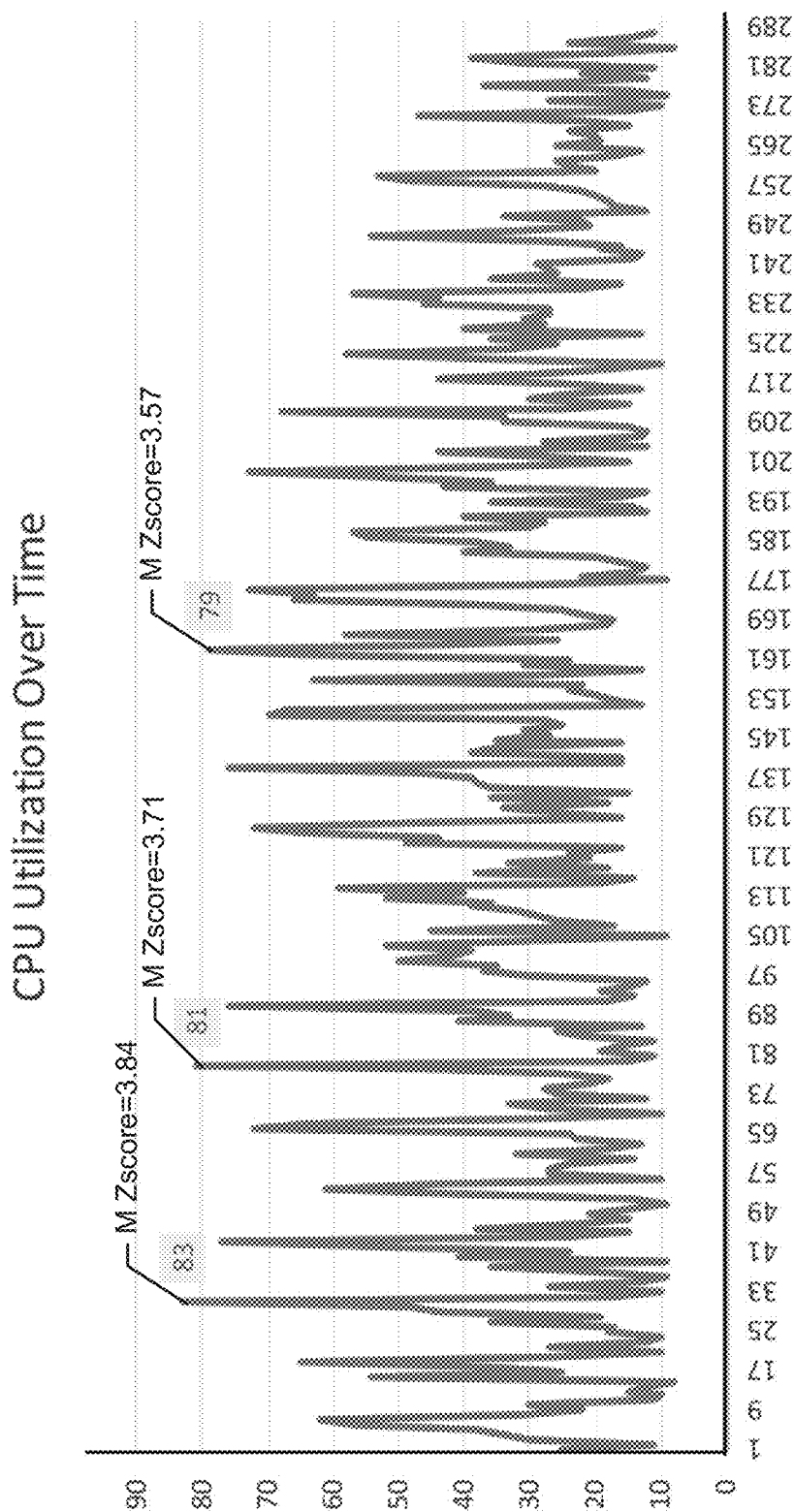
FIG. 13 is a graph of modified Z-scores that are determined from performance measurements of a resource, and illustrates three identified anomaly events.
Figure 14:
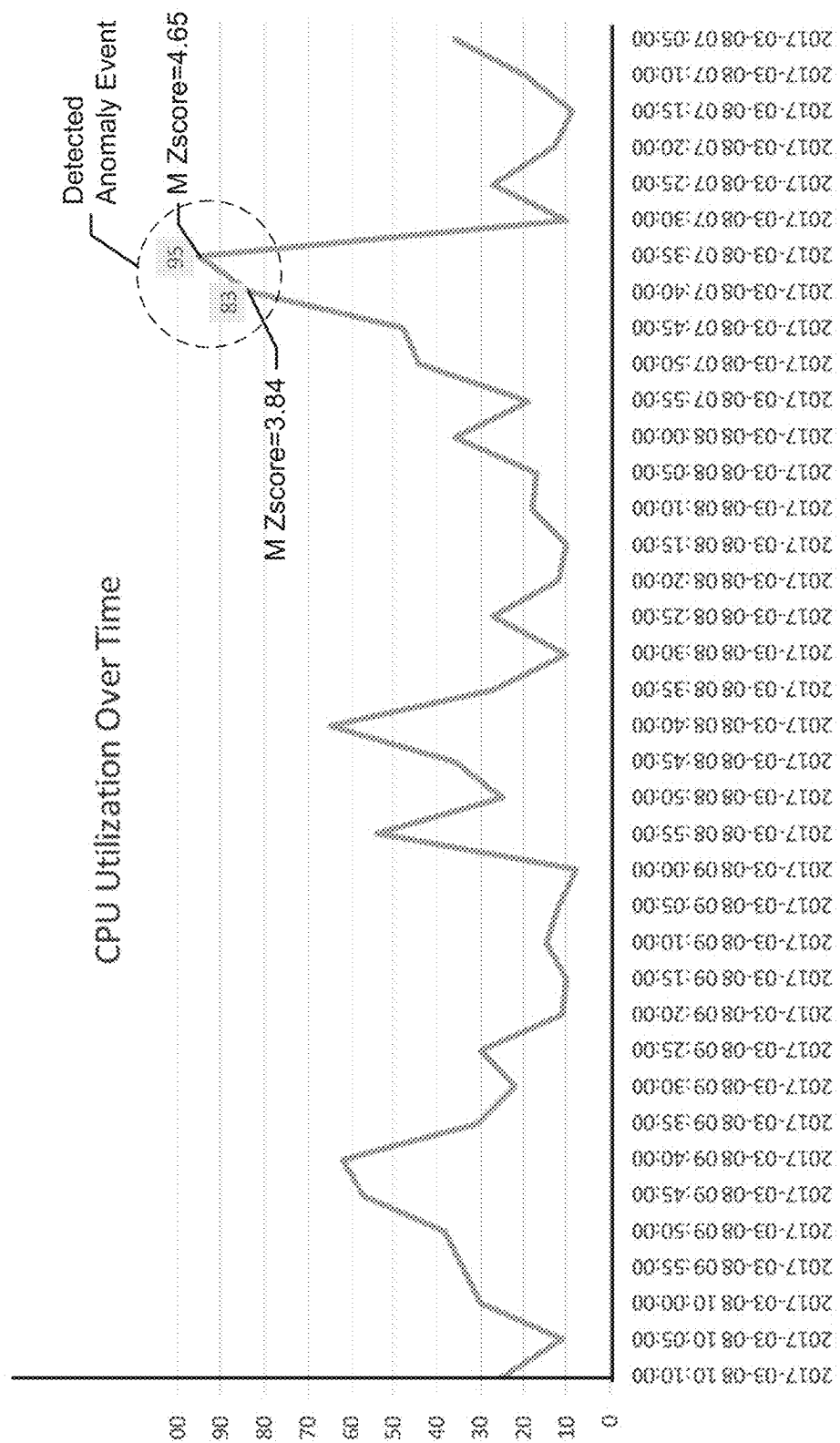
FIG. 14 is another graph of modified Z-scores determined from performance measurements of a resource, and illustrates a single identified anomaly event.

As explained above, the performance anomaly detector makes the detection of an anomaly event (block 404 of FIG. 4) also contingent on determining that a threshold number of other modified Z-scores, which are determined for the other performance metric values in the sequence and are within a sequence window range of the performance metric value, also exceed the Z-score anomaly threshold. For example, only when a threshold-X (e.g., 3) out of a threshold-Y (e.g., 5), where X is not greater than Y, of the performance metric measurements in a series have resulting Z-scores that exceed the Z-score anomaly threshold, will the performance anomaly detector make a determination that an anomaly event has occurred with the resource. FIGS. 13 and 14 illustrate associated example operations.

FIG. 13 is a graph of modified Z-scores that are determined from performance measurements of a resource. In the example of FIG. 13, the performance anomaly detector is configured to detect occurrence of an anomaly event whenever one of the modified Z-scores exceeds the Z-score anomaly threshold of 3.5, thus the threshold-X is 1 and the threshold-Y is 1. The X-axis shows a poll cycle number (i.e., a series of polling cycles where performance metrics have been obtained from a resource), and the Y-axis shows the performance metric values (e.g., utilization values of a selected one of a plurality of network input/output circuits of a network router) that were obtained at each polling cycle (e.g., poll every 5 minutes). The performance anomaly detector has identified three anomaly events where the modified Z-scores ("M Zscore") are 3.84, 3.71, and 3.57.

FIG. 14 is another graph of modified Z-scores that are determined from performance measurements of a resource. In the example of FIG. 14, the performance anomaly detector is configured to detect occurrence of an anomaly event whenever 2 of the modified Z-scores exceeds the Z-score anomaly threshold of 3.5 out of a series of 2 adjacent performance metrics, thus the threshold-X is 2 and the threshold-Y is 2. The X-axis shows a poll cycle number (i.e., a series of polling cycles where performance metrics have been obtained from a resource), and the Y-axis shows the performance metric values (e.g., utilization values of a selected one of a plurality of network input/output circuits of a network router) that were obtained at each polling cycle (e.g., poll every 5 minutes). The performance anomaly detector has identified one anomaly event where the modified Z-scores ("M Zscore") for two adjacent polling cycles (measurements) are 3.84 and 4.65.

Making the detection of an anomaly event (block 404 of FIG. 4) further contingent on determining that a threshold number of modified Z-scores exceed the Z-score anomaly threshold within a sequence window range, can reduce the occurrence of false positive anomaly event detections. Reducing the probability of such false positives avoids potential unneeded operation disruption to the resource and its computing system, and avoids potential false alarm notifications to a system administrator.

In some further embodiments, the operations to detect (block 404) occurrence of an anomaly event for the resource responsive are based on determining that: 1) the modified Z-score exceeds the Z-score anomaly threshold; and 2) a threshold percentage number of other modified Z-scores, which are determined for the other performance metric values in the sequence and are within a sequence window range of the performance metric value, also exceed the Z-score anomaly threshold. Accordingly, the operations for determining the precondition described above for determining a threshold number of other modified Z-scores also exceed the Z-score anomaly threshold, may include determining whether a threshold percentage number of other modified Z-scores also exceed the Z-score anomaly threshold.

The operations to detect (block 404) occurrence of an anomaly event for the resource responsive may further be based on determining that a threshold number of modified Z-scores determined consecutively in a sequence each exceed the Z-score anomaly threshold. For example, the condition may be satisfied by 3 (i.e., the threshold number) consecutively determined modified Z-scores each exceeding the Z-score anomaly threshold.

It has been determined that a static Z-score anomaly threshold value of 3.5 may provide a sufficient level of accuracy and robustness for detecting occurrence of anomalies irrespective of the particular operational configuration of the resource being measured and/or the performance characteristic of the resource that is being measured. However, in some other embodiments, the Z-score anomaly threshold value is dynamically tuned such as explained below.

The performance anomaly detector may change the Z-score anomaly threshold and/or the sequence window range based on volatility determined from the amount of variation in the sequence of performance metric values that are measured over time for the resource and/or based on volatility determined from the amount of variation in the modified Z-scores that are calculated over time. Referring to the operations of FIG. 6, the performance anomaly detector measures (block 600) volatility as an amount of variation in the sequence of performance metric values that include the performance metric value and other performance metric values that were measured for the resource earlier in time than the performance metric value. Alternatively or additionally, the performance anomaly detector measures (block 600) volatility in the amount of variation in the modified Z-scores that are calculated over time. The performance anomaly detector determines (block 602) if the volatility measurement indicates more than a first threshold level of volatility and, if so, the Z-score anomaly threshold is increased (block 604). The performance anomaly detector may additionally or alternatively increase (block 606) the sequence window range, which is to be used for the detecting (block 404 of FIG. 4) occurrence of an anomaly event for the resource, when the volatility measurement indicates more than the first threshold level of volatility.

In contrast, when the volatility measurement indicates less than the first threshold level of volatility, the performance anomaly detector can determine (block 608) if the volatility measurement indicates less than a second threshold level of volatility, which is less than the first threshold level of volatility, and, if so, can decrease (block 610) the Z-score anomaly threshold. The performance anomaly detector may additionally or alternatively decrease (block 612) the sequence window range when the volatility measurement indicates less than the second threshold level of volatility.

Increasing the Z-score anomaly threshold and/or the sequence window range when the volatility measurement indicates more than the first threshold level of volatility may decrease sensitivity of the performance anomaly detector to higher volatility in the measurements and/or the determined scores and, thereby, avoid mischaracterization of modified Z-scores as being anomalous when the increased values are due to volatility in the measurements or scores over time. Conversely, decreasing the Z-score anomaly threshold and/or the sequence window range when the volatility measurement indicates less than the second threshold level volatility may increase the sensitivity of the performance anomaly detector to being able to detect occurrence of anomalous events when there is a relatively lower level of volatility in the measurements. Changing of the Z-score anomaly threshold may be further preconditioned on the volatility measurement of the resource remaining outside the defined range of capacity utilization for at least a threshold number of the performance metric measurements.

The performance anomaly detector may change the Z-score anomaly threshold and/or the sequence window range based on how much capacity of the resources is being utilized. Referring to the operations of FIG. 7, the performance anomaly detector determines (block 700) capacity utilization of the resource indicated by the performance metric value. The performance anomaly detector determines (block 702) if the capacity utilization is outside a defined range of capacity utilization and, if so, the Z-score anomaly threshold is increased (block 704). The performance anomaly detector may additionally or alternatively increase (block 706) the sequence window range, which is to be used for the detecting (block 404 of FIG. 4) occurrence of an anomaly event for the resource, when the capacity utilization is outside the defined range of capacity utilization.

In contrast, when the capacity utilization is within the defined range of capacity utilization by a defined margin value, the performance anomaly detector can decrease (block 710) the Z-score anomaly threshold. The performance anomaly detector may additionally or alternatively decrease (block 712) the sequence window range when the capacity utilization is within the defined range by the defined margin value.

Increasing the Z-score anomaly threshold and/or the sequence window range when the capacity utilization of the resource is outside the defined range of capacity utilization may decrease sensitivity of the performance anomaly detector to potentially higher resulting volatility in the measurements and/or the scores over time and, thereby, avoid misidentification of modified Z-scores as being anomalous when the increased values are due to particularly high or low capacity average utilization of the resource. Conversely, decreasing the Z-score anomaly threshold and/or the sequence window range when the capacity utilization is within the defined range by the defined margin may increase the sensitivity of the performance anomaly detector to being able to detect occurrence of anomalous events when the resource is being utilized within a more typical loading. Changing of the Z-score anomaly threshold may be further preconditioned on the capacity utilization of the resource remaining outside the defined range of capacity utilization for at least a threshold number of the performance metric measurements.

The performance anomaly detector may change the Z-score anomaly threshold and/or the sequence window range based on feedback that is received which indicates how frequently occurrences of anomaly events have been erroneously determined. For example, the system administrator or system component may provide feedback of when an excessive number of false positive notifications of anomalous events have been reported, and the performance anomaly detector can respond thereto by changing the Z-score anomaly threshold and/or the sequence window range to reduce or eliminate such false positive notifications.

Figure 8:
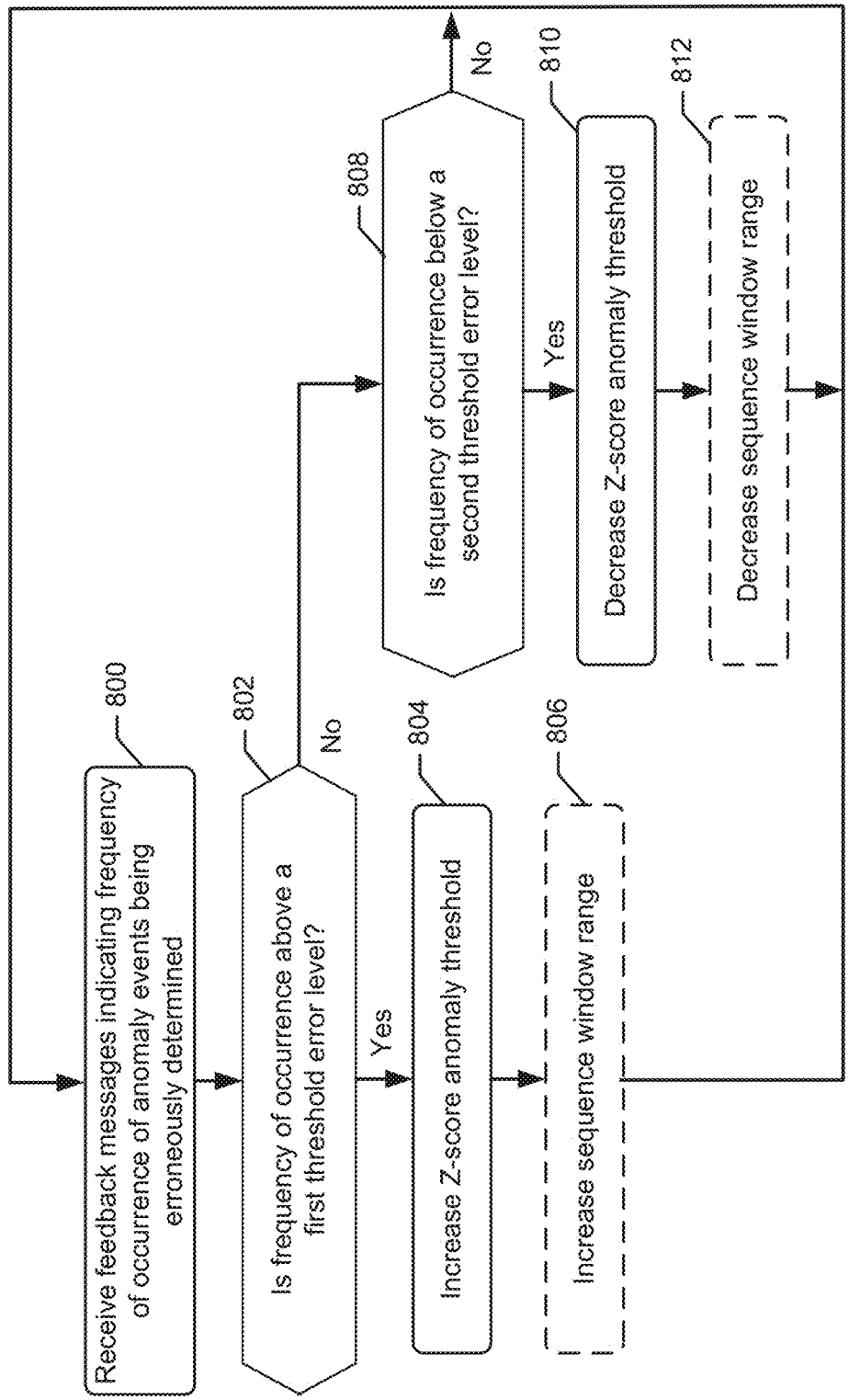
Figure 9:
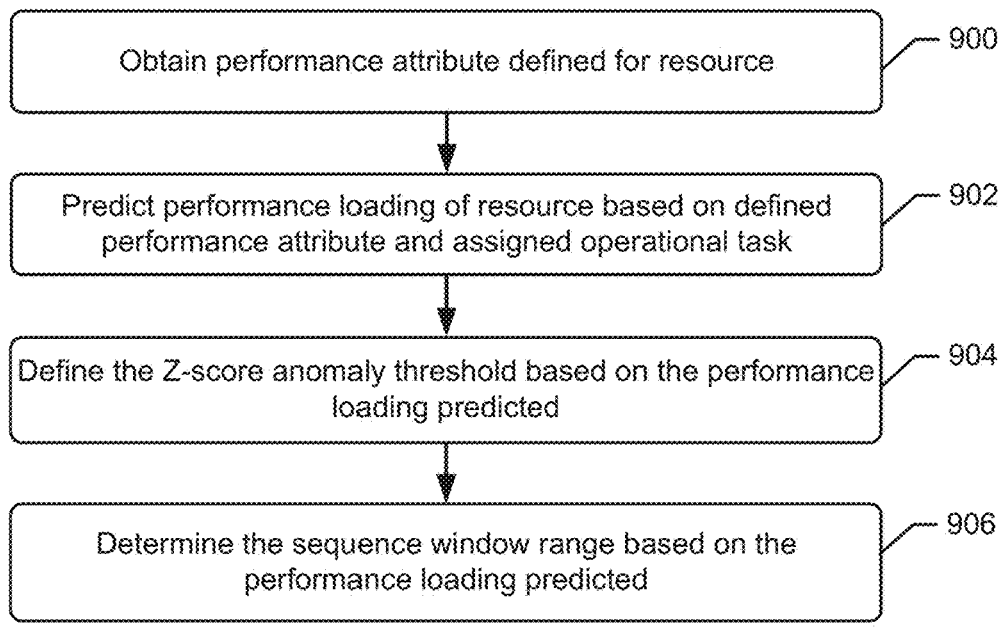

Referring to the operations of FIG. 8, the performance anomaly detector receives (block 800) feedback messages indicating a frequency of occurrence of anomaly events being erroneously determined. The performance anomaly detector determines (block 802) if the frequency of occurrence is above a first threshold error level and, if so, the Z-score anomaly threshold is increased (block 804). The performance anomaly detector may additionally or alternatively increase (block 806) the sequence window range, which is to be used for the detecting (block 404 of FIG. 4) occurrence of an anomaly event for the resource, when the frequency of occurrence is above a first threshold error level.

In contrast, when the frequency of occurrence is below a second threshold error level, which is less than the first threshold error level, the performance anomaly detector can decrease (block 810) the Z-score anomaly threshold. The performance anomaly detector may additionally or alternatively decrease (block 812) the sequence window range when the frequency of occurrence is below the second threshold error level.

Increasing the Z-score anomaly threshold and/or the sequence window range when the frequency of occurrence is above a first threshold error level may decrease sensitivity of the performance anomaly detector and, thereby, avoid misidentification of modified Z-scores as being anomalous. Conversely, decreasing the Z-score anomaly threshold and/or the sequence window range when the frequency of occurrence is below the second threshold error level may increase the sensitivity of the performance anomaly detector to being able to detect occurrence of anomalous events.

In some further embodiments, the performance anomaly detector defines the Z-score anomaly threshold in the sequence window range based on the predicted performance loading of the resource. Referring to the operations of FIG. 9, a performance attribute that has been defined for the resource is obtained (block 900). Performance loading of the resources is predicted (block 902) based on the performance attribute that was defined for the resource and based on an operational task assigned to the resource (e.g., software that has been or will be provided to the resource for execution). The Z-score anomaly threshold is then defined (block 904) based on the performance loading that has been predicted.

The sequence window range may also be determined (block 906) based on the performance loading that has been predicted.

The performance anomaly detector may identify geographic region in which the resources operating, and determine the Z-score anomaly threshold based on that geographic region. For example, a higher operational anomaly rate may be expected for resources that reside in a particular geographic region, such as due to lack of adequate cooling systems and/or stable power sources. Setting the Z-score anomaly threshold to a lower value responsive to the resource being in that particular geographic region can beneficially increase sensitivity of the anomaly detection in anticipation of a higher occurrence rate of anomalies. Alternatively, setting the Z-score anomaly threshold to a higher value responsive to the resource being in that particular geographic region may beneficially decrease sensitivity of the anomaly detection in anticipation of a higher occurrence rate of anomalies to avoid over-reporting and/or avoid an excessive number of triggered remedial actions.

The performance anomaly detector may obtain a performance attribute defined for the resource, and determine the Z-score anomaly threshold based on that performance attribute. For example, certain types of resources, such as ultrahigh data storage density magnetic hard drives, can be expected to have a higher operational anomaly rate. Setting the Z-score anomaly threshold to a lower value responsive to the resource having that performance attribute can beneficially increase sensitivity of the anomaly detection in anticipation of a higher occurrence rate of anomalies.

Figure 10:
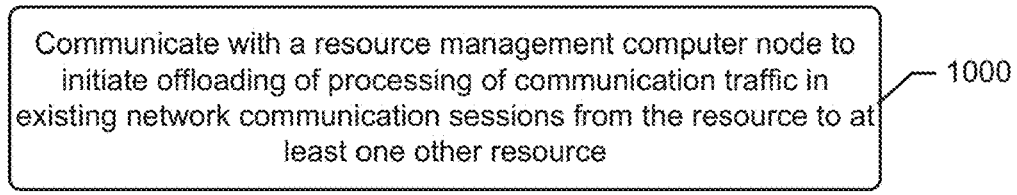
Figure 11:
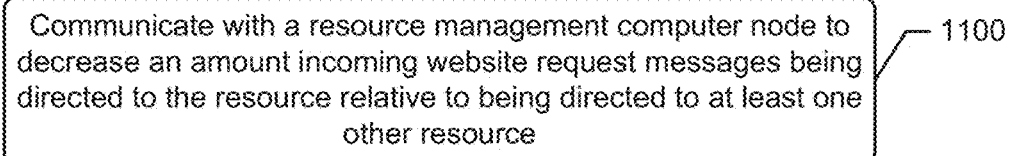
Figure 12:
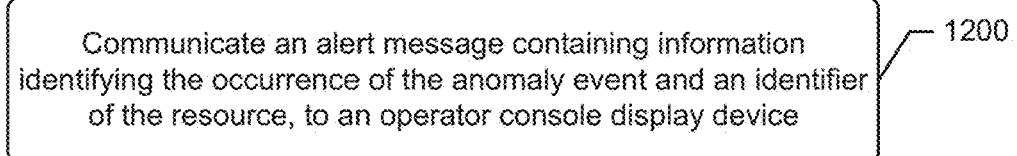

FIG. 10-12 illustrate operations that may be performed by a performance anomaly detector to initiate a remedial action for the resource responsive to detecting occurrence of an anomaly event.

Referring initially to FIG. 10, a performance anomaly detector responds to detecting an anomaly event with the resource by communicating (block 1000) with a resource management computer node to initiate offloading of processing of communication traffic in existing network communication sessions from the resource to at least one other resource. For example, the performance anomaly detector 220 of FIG. 1 may communicate with the resource management computer node 230 to cause it to decrease or cease assigning further processing tasks, storage tasks, network traffic intrusion detection and/or virus detection tasks, and/or other task to the resource associated with the anomaly event. In one embodiment, the performance anomaly detector 220 may cause the resource management computer node 230 to cease routing a defined type of traffic (e.g., video stream, voice stream, traffic requiring at least a threshold quality of service, or other defined type of traffic) to the resource responsive to the anomaly. Thus, in a cloud computing environment, the performance anomaly detector 220 can cause the resource management computer node 230 to change its loading of resources based on whether anomaly events have been detected with any of those resources.

Referring to FIG. 11, a performance anomaly detector responds to detecting an anomaly event with the resource by communicating (block 1100) with a resource management computer node to decrease an amount of incoming website request messages that are being directed, by the resource management computer node, to the resource relative to a number that is being directed to at least one other resource.

Referring to FIG. 12, a performance anomaly detector responds to detecting an anomaly event with the resource by communicating (block 1200) an alert message containing information that identifies the occurrence of the anomaly event in identifier of the resource, to an operator console display device. The alert message may be communicated through a short message service text message transmitted through a cellular system, an email message communicated through the Internet and/or private network to an email server, an automated phone call, and/or signaling that triggers display on an alert notification on a display device. The system administrator can thereby be notified of the anomaly event and may take steps to, for example, perform their testing of the resource and, if needed, replacing the resource.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   performing operations as follows on a processor of a performance anomaly detector:
   obtaining a performance metric value from a performance measurement of operation of a resource of a computing system, wherein the performance metric value is one of a sequence of performance metric values obtained during operation of the resource;
   determining a modified Z-score based on the performance metric value;
   comparing the modified Z-score to a Z-score anomaly threshold;
   detecting occurrence of an anomaly event for the resource responsive to determining that: 1) the modified Z-score exceeds the Z-score anomaly threshold; and 2) a threshold number of other modified Z-scores, which are determined for other performance metric values in the sequence and are within a sequence window range of the performance metric value, also exceed the Z-score anomaly threshold; and initiating a remedial action for the resource responsive to detecting the occurrence of the anomaly event for the resource.

2. The method of claim 1, wherein determining the modified Z-score, comprises:
determining a median of the sequence of performance metric values, wherein the sequence includes other performance metric values that were measured for the resource earlier in time than the performance metric value;
determining a median absolute deviation of the sequence of performance metric values;
determining a difference value between the performance metric value and the median; and
determining the modified Z-score based on a ratio of the difference value to the median absolute deviation.

3. The method of claim 1, wherein obtaining the performance metric value from the performance measurement of the resource of the computing system comprises:
generating a message containing a performance metric polling command addressed to an application programming interface provided by the resource; and
communicating the message to a network interface circuit, wherein the message is addressed for delivery to the resource.

4. The method of claim 1, further comprising:
measuring volatility in an amount of variation over time in the sequence of performance metric values, wherein the sequence includes other performance metric values that were measured for the resource earlier in time than the performance metric value;
increasing the Z-score anomaly threshold when the volatility measurement indicates more than a first threshold level of volatility; and
decreasing the Z-score anomaly threshold when the volatility measurement indicates less than a second threshold of volatility that is not greater than the first threshold level of volatility.

5. The method of claim 4, further comprising:
increasing the sequence window range, which is to be used for the detecting occurrence of an anomaly event for the resource, when the volatility measurement indicates more than the first threshold level of volatility; and
decreasing the sequence window range, which is to be used for the detecting occurrence of an anomaly event for the resource, when the volatility measurement indicates less than the second threshold of volatility.

6. The method of claim 1, further comprising:
increasing the Z-score anomaly threshold when the performance metric value indicates that the resource has a capacity utilization outside a defined range of capacity utilization.

7. The method of claim 6, further comprising:
increasing the sequence window range, which is to be used for the detecting occurrence of an anomaly event for the resource, when the performance metric value indicates that the resource has a capacity utilization outside the defined range of capacity utilization.

8. The method of claim 1, further comprising:
identifying a geographic region in which the resource is operating; and
determining the Z-score anomaly threshold based on the geographic region.

9. The method of claim 1, further comprising:
obtaining a performance attribute defined for the resource; and
determining the Z-score anomaly threshold based on the performance attribute.

10. The method of claim 9, wherein determining the Z-score anomaly threshold based on the performance attribute comprises:
predicting a performance loading of the resource based on the performance attribute and an identifier for an operational task of the computing system that is assigned to be performed by the resource; and
defining the Z-score anomaly threshold based on the predicted performance loading.

11. The method of claim 10, further comprising:
determining the sequence window range, which is to be used for the detecting occurrence of an anomaly event for the resource, based on the predicted performance loading.

12. The method of claim 1, further comprising:
receiving feedback messages indicating frequency of occurrence of anomaly events being erroneously determined by the performance anomaly detector;
increasing the Z-score anomaly threshold when the frequency of occurrence is determined to be above a first threshold error level; and
decreasing the Z-score anomaly threshold when the frequency of occurrence is determined to be below a second threshold error level that is not greater than the first threshold error level.

13. The method of claim 1, further comprising:
repeating for each one of a set of other resources of the computing system:
the obtaining a performance metric value, the determining a modified Z-score, the comparing the modified Z-score to a Z-score anomaly threshold, and the detecting occurrence of an anomaly event for that other resource.

14. The method of claim 13, wherein the repeating for each one of the set of other resources of the computing system further comprises:
obtaining a performance attribute of that other resource, and
determining based on the performance attribute the Z-score anomaly threshold that is to be compared to the modified Z-score when detecting occurrence of an anomaly event for that other resource.

15. The method of claim 1, wherein initiating the remedial action for the resource responsive to detecting the occurrence of the anomaly event for the resource comprises:
communicating with a resource management computer node to initiate offloading of processing of communication traffic in existing network communication sessions from the resource to at least one other resource of the computing system, wherein the existing network communication sessions are with user devices and are being processed by the resource.

16. The method of claim 1, wherein initiating the remedial action for the resource responsive to detecting the occurrence of the anomaly event for the resource comprises:
communicating with a resource management computer node to decrease an amount incoming website request messages being directed to the resource relative to being directed to at least one other resource of the computing system.

17. The method of claim 1, wherein initiating the remedial action for the resource responsive to detecting the occurrence of the anomaly event for the resource comprises:

communicating an alert message, containing information identifying the occurrence of the anomaly event and an identifier of the resource, to an operator console display device.

18. A method comprising:

performing operations as follows on a processor of a performance anomaly detector:

obtaining a performance metric value from a performance measurement of operation of a resource of a computing system, wherein the performance metric value is one of a sequence of performance metric values obtained during operation of the resource;

determining a modified Z-score based on the performance metric value;

comparing the modified Z-score to a Z-score anomaly threshold;

detecting occurrence of an anomaly event for the resource responsive to determining that: 1) the modified Z-score exceeds the Z-score anomaly threshold; and 2) a threshold number of other modified Z-scores, which are determined for other performance metric values in the sequence and are within a sequence window range of the performance metric value, also exceed the Z-score anomaly threshold; and initiating a remedial action for the resource responsive to detecting the occurrence of the anomaly event for the resource, wherein the remedial action comprises communicating with a resource management computer node to initiate offloading of processing of communication traffic in existing network communication sessions from the resource to at least one other resource of the computing system, wherein the existing network communication sessions are with user devices and are being processed by the resource.

19. A performance anomaly detector comprising:

a network interface circuit configured to communicate with resources of a distributed computing system;

a processor circuit coupled to the network interface circuit; and a memory circuit coupled to the processor circuit and storing program code which when executed by the processor circuit causes the processor circuit to perform operations comprising:

communicating a message through the network interface circuit and containing a performance metric polling command addressed to an application programming interface provided by a resource among the resources;

receiving a response message through the network interface circuit and containing a performance metric value from a performance measurement of operation of a resource of a distributed computing system performed responsive to the performance metric polling command, wherein the performance metric value is one of a sequence of performance metric values obtained during operation of the resource;

determining a modified Z-score based on the performance metric value;

comparing the modified Z-score to a Z-score anomaly threshold;

detecting occurrence of an anomaly event for the resource responsive to determining that: 1) the modified Z-score exceeds the Z-score anomaly threshold; and 2) a threshold number of other modified Z-scores, which are determined for other performance metric values in the sequence and are within a sequence window range of the performance metric value, also exceed the Z-score anomaly threshold;

initiating a remedial action for the resource responsive to detecting the occurrence of the anomaly event for the resource;

measuring volatility in the sequence of performance metric values, wherein the sequence includes other performance metric values that were measured for the resource earlier in time than the performance metric value;

increasing the Z-score anomaly threshold when the volatility measurement indicates more than a first threshold level of volatility; and decreasing the Z-score anomaly threshold when the volatility measurement indicates less than a second threshold of volatility that is not greater than the first threshold level of volatility.

20. The performance anomaly detector of claim 19, the operations further comprising:

increasing the sequence window range, which is to be used for the detecting occurrence of an anomaly event for the resource, when the volatility measurement indicates more than the first threshold level of volatility; and decreasing the sequence window range, which is to be used for the detecting occurrence of an anomaly event for the resource, when the volatility measurement indicates less than the second threshold of volatility.

* * * * *